(12) United States Patent
Bieder et al.

(10) Patent No.: US 12,498,514 B2
(45) Date of Patent: Dec. 16, 2025

(54) TRIM PART HAVING A TWO-DIMENSIONAL LIGHT GUIDE

(71) Applicant: MERCEDES-BENZ GROUP AG, Stuttgart (DE)

(72) Inventors: Hubert Bieder, Denkendorf (DE); Eva-Susanne Jaeger, Böblingen (DE); Daniel Betz, Rottenburg-Seebronn (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 108 days.

(21) Appl. No.: 18/283,510

(22) PCT Filed: Jan. 27, 2022

(86) PCT No.: PCT/EP2022/051844
§ 371 (c)(1),
(2) Date: Sep. 22, 2023

(87) PCT Pub. No.: WO2022/199907
PCT Pub. Date: Sep. 29, 2022

(65) Prior Publication Data
US 2025/0147218 A1    May 8, 2025

(30) Foreign Application Priority Data
Mar. 23, 2021  (DE) ............... 10 2021 001 512.6

(51) Int. Cl.
*G02B 6/00* (2006.01)
*F21V 8/00* (2006.01)

(52) U.S. Cl.
CPC ......... *G02B 6/0036* (2013.01); *G02B 6/0028* (2013.01); *G02B 6/0065* (2013.01)

(58) Field of Classification Search
CPC ... G02B 6/0036; G02B 6/0028; G02B 6/0065
See application file for complete search history.

(56) References Cited

U.S. PATENT DOCUMENTS 9,405,052 B1 *  8/2016  Jalava .................. G02B 6/0028
9,891,369 B2     2/2018  Wimmer et al.
(Continued)

FOREIGN PATENT DOCUMENTS

DE   102013021600 A1   8/2014
DE   102013010163 A1   12/2014
(Continued)

OTHER PUBLICATIONS

Office Action dated Jan. 8, 2025 in related/corresponding KR Application No. 10-2023-7029654.
(Continued)

*Primary Examiner* — Gerald J Sufleta, II
(74) *Attorney, Agent, or Firm* — PATENT PORTFOLIO BUILDERS PLLC

(57) ABSTRACT

A two-dimensional light guide has at least three layers, including two layers formed as films have a lower refractive index than a light guidance layer arranged between them. One of the films has decoupling structures for the light. The layers form a film composite in which the light guidance layer is formed as a film. A lighting element can include having such a two-dimensional light guide and a coupled input coupling light guide. A trim part can have a light source coupled with the two-dimensional light guide and include lighting and the input coupling light guide is arranged such that a surface portion is actively lit and a non-light-transmissive surface portion hides the light source and the coupling when viewed from a viewing direction.

2 Claims, 2 Drawing Sheets

(56) References Cited

U.S. PATENT DOCUMENTS

Figure 1:
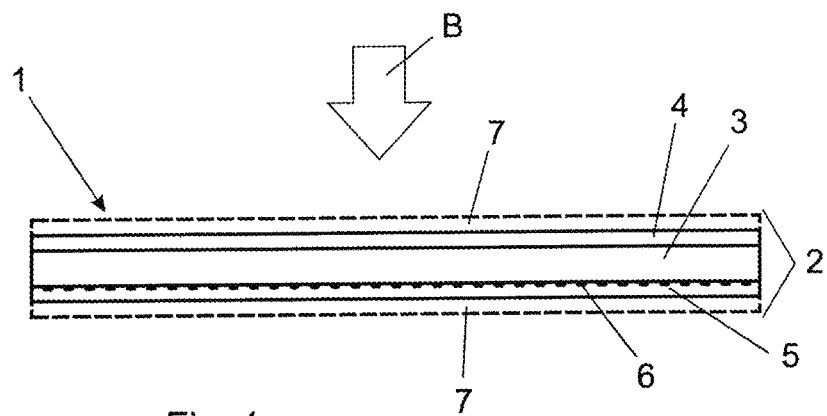

| | | | |
|---|---|---|---|
| 2006/0002675 A1 | 1/2006 | Choi et al. | |
| 2007/0133935 A1 | 6/2007 | Fine | |
| 2013/0215646 A1* | 8/2013 | Kusuura | G02B 6/006 362/613 |
| 2013/0314942 A1* | 11/2013 | Nichol | G02B 6/0028 362/603 |
| 2014/0211498 A1* | 7/2014 | Cannon | B60Q 3/217 362/555 |
| 2015/0301262 A1* | 10/2015 | Wakui | G02B 6/0063 362/607 |
| 2016/0129945 A1 | 5/2016 | Deppe | |
| 2017/0045666 A1* | 2/2017 | Vasylyev | G02B 6/0068 |
| 2018/0149325 A1 | 5/2018 | Lee et al. | |
| 2021/0055467 A1 | 2/2021 | Humbach et al. | |
| 2021/0061163 A1* | 3/2021 | Black | B32B 27/306 |
| 2023/0083665 A1* | 3/2023 | Bergsten | G02B 6/0008 |

FOREIGN PATENT DOCUMENTS

| | | |
|---|---|---|
| DE | 102014112470 A1 | 3/2016 |
| DE | 102014006490 B4 | 4/2016 |
| DE | 102019001333 A1 | 1/2020 |
| DE | 102019202804 A1 | 9/2020 |
| DE | 102019112889 A1 | 11/2020 |
| EP | 2157366 A1 | 2/2010 |
| JP | 2011124168 A | 6/2011 |
| JP | 2016096092 A | 5/2016 |
| JP | 2017021916 A | 1/2017 |
| KR | 1020130014941 A | 2/2013 |
| WO | 2007077099 A1 | 7/2007 |

OTHER PUBLICATIONS

International Search Report and Written Opinion mailed May 9, 2022 in related/corresponding International Application No. PCT/EP2022/051844.

Office Action created Oct. 12, 2022 in related/corresponding DE Application No. 10 2021 001 512.6.

Office Action dated Sep. 17, 2024 in related/corresponding JP Application No. 2023-558674.

* cited by examiner

TRIM PART HAVING A TWO-DIMENSIONAL LIGHT GUIDE

BACKGROUND AND SUMMARY OF THE INVENTION

Exemplary embodiments of the invention relate to a trim part having a two-dimensional light guide for actively lighting a surface portion.

Two-dimensional light guides are known in principle from the prior art. DE 10 2019 001 333 A1 thus describes a lighting device having such a two-dimensional light guide. The latter is formed from two films that are connected to the actual light guide by the material of this light guide, for example polycarbonate, being injected between the two films with a lower refractive index than that of the light guide. The entire structure can thus be implemented such that it is relatively flat, having a component thickness of only a few millimeters, typically of 3 or more millimeters. However, it does not allow any significant flexibility. Even thinner superstructures than the specified 3 mm are not realistic at the dimensions typically required for the injection molding.

DE 10 2014 006 490 B4 claims a two-dimensional lighting element having a light source, a two-dimensional light guide, and a transparent film, wherein the film and the light guide are produced from materials having different refractive indices and the light guide is formed by back-injecting the film, and thus in a similar manner as in the prior art specified above.

US 2007/0133935 A1 describes a flexible optical element having a waveguide. DE 10 2019 202 804 A1 describes a light guidance film that can be used in a film composite.

DE 10 2013 021 600 A1 further describes a panel light formed from different layers. The core is respectively a transparent carrier structure that is combined with a light guide formed from films, such that the carrier structure is formed with a lower refractive index than the film of the actual light guide. The latter can also be covered by a further film having a lower refractive index and decoupling structures in order to decouple light throughout the transparent carrier structure.

WO 2007/077099 A1 describes a similar structure having a light coupling formed by a coupling element or a light guide formed by optical fibers.

DE 10 2019 112 889 A1 and DE 10 2013 010 163 A1 both describe light guidance films that can be arranged on vehicle windows.

These last specified superstructures are not very flexible and are relatively bulky, in particular with regard to their thickness.

A lit trim part is known from DE 10 2014 112 470 A1. Light beams generated by a lighting means are coupled into a composite film having a light guidance layer. A very similar trim part is also known from US 2021/0055467 A1.

References can further be made to US 2006/0002675 A1 and EP 2 157 366 A1 as further prior art. The latter are from the field of screen lighting or backlighting, and also feature thin light guidance layers.

Thus, exemplary embodiments of the present invention are directed to an improved trim part having a two-dimensional light guide for actively lighting a surface portion.

The trim part according to the invention having a two-dimensional light guide for actively lighting a surface portion and having at least one light source arranged on the end face of the two-dimensional light guide provides that the light source comprises at least one lighting means that is directly or immediately connected to the two-dimensional light guide and is arranged hidden behind a non-light-transmissive surface portion in a viewing direction onto the trim part and is connected to the two-dimensional light guide. The arrangement and coupling of the light source in such a trim part is thus arranged, in particular, in a region behind a portion that is non-transmissive for light. This portion, which is designed as an opaque surface portion of the trim part, thus hides the light coupling into the two-dimensional light guide, as well as the light source itself. Inhomogeneities and points or regions that are illuminated particularly brightly are thus covered as if by a kind of shutter, such that the trim part according to the invention enables an exceptionally homogeneous and even coloration that can be created particularly easily in the region of its actively lit surface, which enables a great freedom of design at high quality, directly or via a corresponding transparent decoration arranged upstream.

The two-dimensional light guide of the trim part according to the invention comprises three layers, similarly to the light guide described in the prior art specified in the introduction, wherein two layers formed as films have a lower refractive index than a light guidance layer arranged between them. One of the films additionally has decoupling structures for the light, similar to those described in the prior art specified in the introduction. According to the invention, it is the case that the layers form a film composite in which the light guidance layer is formed as a film. Such a structure, which previously has always been formed from a solid material, for example a flat material made from polycarbonate or the like, or from a material of this type generated by injection-molding or back-injection, always has a relatively high thickness in principle, of typically at least 3 to 5 mm, and a relatively low flexibility. The structure according to the invention made of the three films, which form a film composite, wherein the two outer films have a lower refractive index than the light guidance film lying in the center, bypasses all of these disadvantages. An exceptionally compact structure arises, which can in practice be implemented with a thickness of significantly less than one millimeter, in particular approx. 0.5 mm thickness, of the film composite.

The films of the two-dimensional light guide are coextruded, such that a simple and efficient production is possible. The films themselves can, for example, consist of two polymethylmethacrylate (PMMA) films, between which a film made of polycarbonate (PC) is installed as a light-guiding layer. The entire structure can be produced easily and efficiently by coextrusion at a very low layer thickness and, depending on the layer thickness, high mechanical strength.

In the trim part according to the invention, the light source is formed by an input coupling light guide having at least one integrated lighting means. In particular, this is naturally advantageous if the two-dimensional light guide consists of a film composite. In particular, the two-dimensional light guide and the input coupling light guide can together form a lighting element.

According to an advantageous development of the trim part according to the invention, it can additionally be provided that the film composite is provided with a protective layer on one or on both sides. This protective layer can in turn be a film itself, for example respectively a further polycarbonate film, but it can also be a paint or the like. In a structure in which the two-dimensional light guide or its film composite made of the three layers is directly further processed, for example by injecting or molding a decoration onto one side and a transparent or in particular non-transparent carrier onto the other side, the protective layers are naturally also not required.

A lighting element of the trim part according to the invention can comprise such a two-dimensional light guide as has just been described, and a light guide of a greater thickness coupled with the film composite. The thickness is based on the comparison with the light-guiding film of the film composite. This light guide, which is in particular not formed from a film, serves to couple the light into the light-guiding layer—formed as a film—of the two-dimensional light guide.

According to an advantageous development, it can therefore be provided that this light guide of a greater thickness is coupled with at least one lighting means. The coupling can, for example, be implemented on a strip of polycarbonate in such a way that one or more lighting means, in particular LEDs, can be mechanically coupled to the structure. The lighting means, and optionally control electronics for the lighting means can also be directly integrated, e.g., injected, into this light guide of a greater thickness, however.

This light guide of a greater thickness, which could also be described as an input coupling light guide, has the object of correspondingly capturing the light emitted from the lighting means and, in particular if different colors are used, of homogenizing this light within its overall length before its introduction into the light-guiding film as a light guidance layer. The light output of the lighting means can thus be optimally used, which would not be directly possible with the film due to its low thickness. Additionally, multi-colored light always requires a certain running time of the light within a light guide until a homogeneous color mixture is created, such that this can also be generated within the larger light guide before the now homogeneous light is coupled into the corresponding light guidance layer of the two-dimensional light guide. The light guide of a greater thickness can be adhered, welded or directly injection-molded onto the film composite. This light guide can be formed conventionally, and thus for example from a single material, e.g., polycarbonate, which is surrounded by an air gap in order to thus achieve the light guidance properties, specifically a total reflection at the interfaces between the material of the light guide and the air. Alternatively, it can also be provided that this light guide of a greater thickness is surrounded with a coating made of a material with a lower refractive index. This material can in turn, for example, be a film made of PMMA or the like, such that in principle, a structure of the light guide of a greater thickness can be provided in the form of DE 10 2019 001 333 A1 specified in the introduction in the prior art. Alternative coatings, for example via paint or the like, are naturally also conceivable.

A further very advantageous embodiment of the trim part according to the invention can additionally provide that the two-dimensional light guide is connected to a carrier and to a decoration by coextrusion, calendaring, and/or back-injection. This structure of a carrier, a decoration, and a two-dimensional light guide can then be injection-molded onto the non-light-conducting surface portion and the light source, or, vice versa, the latter can be injection-molded onto the structure. Overall, an exceptionally compact and efficient trim part is thus created, in particular if the two-dimensional light guide is formed as the film composite described above. Within the light guide, the components can then be connected to one another very easily and efficiently, such that, even when used over a longer period of time, for example if the trim part is installed in a vehicle, there is a stable structure despite vibrations occurring and movements of parts against one another that are unavoidable in a vehicle, the structure not creaking, and individual components in said structure not being able to hit one another.

The two-dimensional light guide according to the invention, the lighting element according to the invention and the trim part according to the invention offer further advantages and embodiments that result in particular from the exemplary embodiments that are described in more detail in the following with reference to the figures.

BRIEF DESCRIPTION OF THE DRAWING FIGURES

Figure 2:
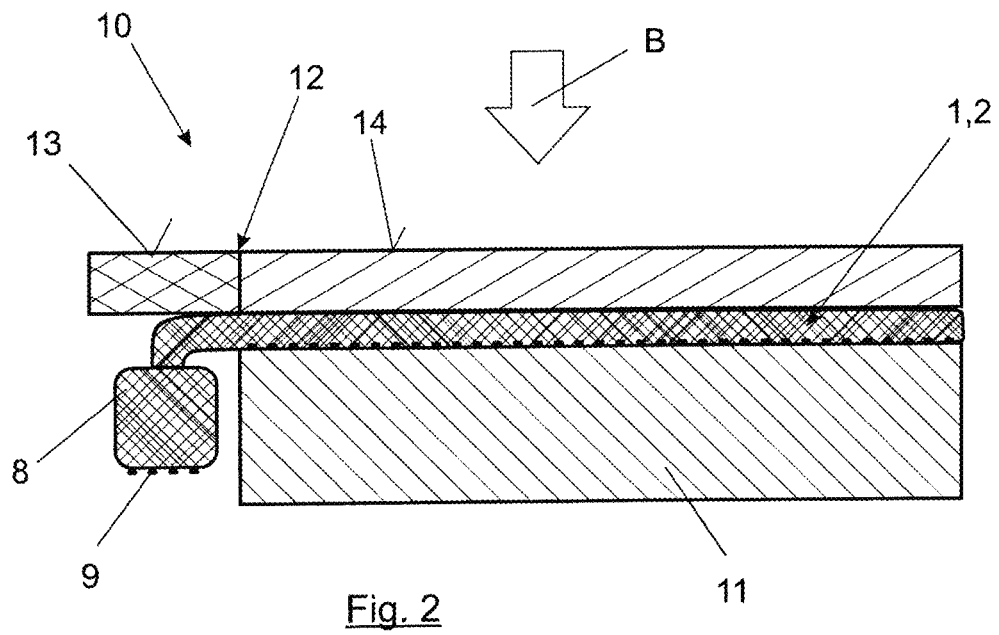
Figure 3:
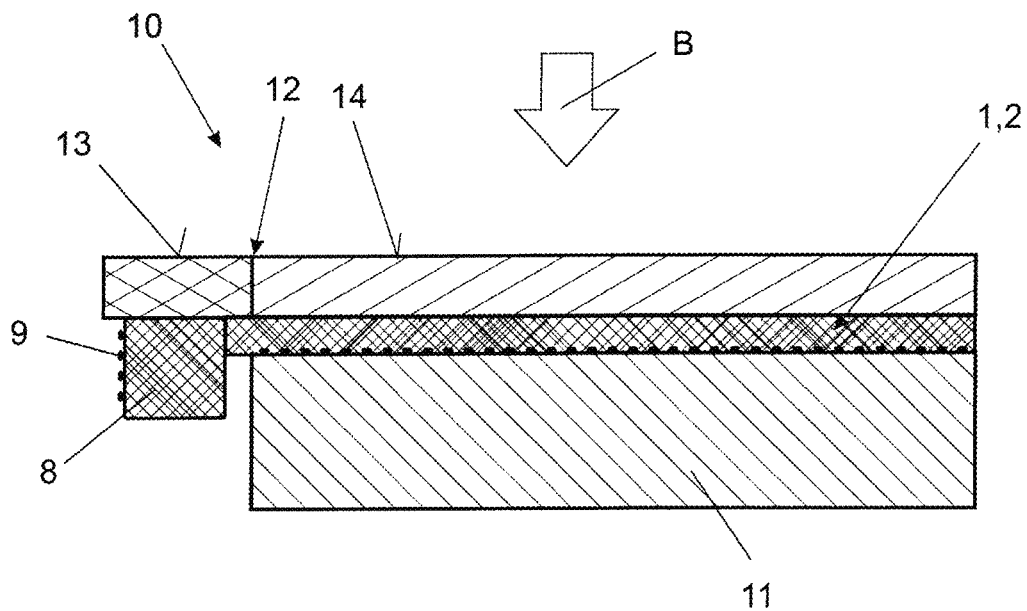
Figure 4:
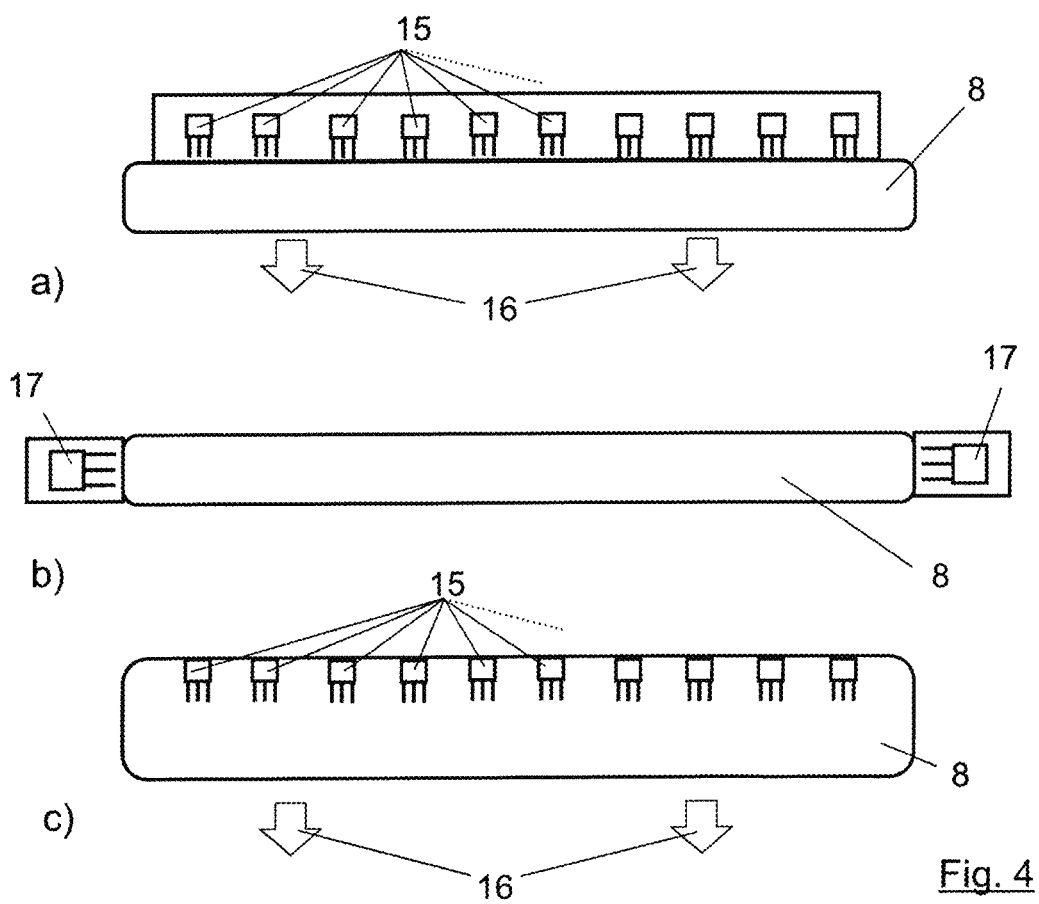

In the figures:

FIG. 1. shows a schematic depiction of a possible embodiment of a two-dimensional light guide;

FIG. 2 schematically shows a section through a possible trim part according to the invention, having a first embodiment of a lighting element;

FIG. 3 schematically shows a section through a possible trim part according to the invention, having a further embodiment of a lighting element; and FIG. 4 shows different possibilities for connecting the lighting means to a light guide.

DETAILED DESCRIPTION

FIG. 1 schematically illustrates a possible structure of a two-dimensional light guide 1 made of a film composite 2. The film composite 2 consists of at least three films. A central light guidance layer is formed as a light guidance film 3. For example, it is implemented as a polycarbonate film. This light guidance film 3 is enclosed by two films 4, 5 with a lower refractive index than the light guidance layer 3. The two films 4, 5 can for example be produced from PMMA (polymethylmethacrylate). One of these two films, the film 5 here in the depiction of FIG. 1, additionally has decoupling structures labelled with 6 within the film 5. These decoupling structures 6 can, for example, be implemented by a sanded surface, by structures installed via laser processing, via structures impressed via screen printing, or the like. They can, in particular, be adapted to a later curvature or the like of the two-dimensional light guide 1, to obtain an even and homogeneous light decoupling independently of the three-dimensional geometric design of the later structure. The direction in which the light is decoupled is at the top in the depiction of FIG. 1, such that the two-dimensional light guide 1 is viewed from above corresponding to the viewing direction B.

This structure made of the three films 3, 4, 5 described here is entirely sufficient for the actual film composite 2 of the two-dimensional light guide 1. Depending on further processing, this structure can be implemented with molded-on decorative layers, molded-on carrier layers, or the like. In particular, the structure can also be placed in a corresponding injection mold and be formed three-dimensionally, before it is completed by back-injection with a carrier layer and/or the application of a decorative layer on the top surface when viewed in the viewing direction B, and is hardened in the shape pre-determined by the mold.

Regardless, it is possible to integrate two protective layers 7, for example in the form of thin polycarbonate films, into the film composite 3 in addition to the three specified layers 3, 4, 5. This optional embodiment can be seen in the depiction of FIG. 1, wherein, as mentioned, the two protective films 7 could also be dispensed with. Depending on the structure, only one of the two protective films 7 can also be provided, for example only the film on the visible side, if a carrier is molded on the opposite side.

Unlike in a structure that can be produced purely via injection molding of the light guide, for example the structure specified in the prior art specified in the introduction, in which the light guide is injected between two PMMA films, it is possible to produce the entire film composite 3 by coextrusion and thus to design the latter to be much thinner. The film composite 3 depicted in FIG. 1 in an exemplary fashion has a thickness of less than 1 mm in practice. By omitting one or both of the protective layers 7, the thickness of the structure can be even further reduced, such that, for example, a functional two-dimensional light guide made of the three films 3, 4, 5 can be implemented with a layer thickness of approx. 0.5 mm. The enclosed light guidance layer of the light guidance film 3 is somewhat thicker than the respective layer thickness of the neighboring PMMA films 4, 5, as indicated approximately to scale in the depiction of FIG. 2.

In principle, a light coupling from the end face into such a film composite 2 is conceivable. In practice, however, this is very difficult, as even small lighting means, such as micro-LEDS, have a certain size and width, and as they emit their light, in particular, at an angle typically of approx. 120°. In the event of a direct connection to the end face of the film composite 2, a not insignificant part of the light would thus be lost.

The film composite 2 of the two-dimensional light guide 1 can thus preferably be combined with an input coupling light guide 8 having a larger thickness. This is shown in principle in the following depiction of FIG. 2. The structure shown there comprises a trim part 10 that has a two-dimensional light guide 1. The latter is constructed from the film composite 2, in particular having the three films 3, 4, 5, wherein in the depiction of FIG. 2, only the decoupling structures labelled 6 of this film composite 2 are depicted again to make the alignment of the film composite 2 of the two-dimensional light guide 1 recognizable in the depiction of FIG. 2. The light direction is here directed upwards, the viewing direction B is correspondingly directed from top to bottom onto the trim part 10. The latter consists of a plastic carrier 11 and a decorative plate, for example made of polycarbonate, wood, aluminum or the like. This decorative plate is backlit by the light decoupled via the two-dimensional light guide 1 counter to the viewing direction B. An opaque surface portion, which is labelled with 13, is additionally connected to the transparent surface portion 12 and altered hatching is correspondingly depicted. This portion 13 is not transmissive to light, and thus hides the components lying behind it in the viewing direction B when viewed in the viewing direction B. In the exemplary embodiment depicted here, these components are the input coupling light guide 8 with the larger thickness, which is designed as a conventional light guide and has corresponding decoupling structures 9 in a known manner. This decoupling light guide can, for example, be injection-molded onto the film composite 2 of the two-dimensional light guide 1, in order to thus transmit light that is coupled into the light guide 8 via lighting means shown later into the two-dimensional light guide. From the viewing direction B, the structure of the light guide 8 and its connection to the film composite 2 lies underneath the non-light-transmissive surface region, such that the input coupling of the light and the transmission cannot be seen through the light-transmissive portion 12 of the decorative plate. The trim part 10 can thus be implemented with a homogeneous lighting of its actively lit surface portion 12 by the film composite 2 of the two-dimensional light guide 1 without the typically non-homogeneously lit region of the light input coupling location becoming visible.

The conventional light guide 8 serves to collect the light of the individual lighting means, and can collect the light of these lighting means very effectively via its greater thickness, such that a majority of the light reaches the conventional light guide 8, and via the latter the two-dimensional light guide 1. Different-colored lighting means or lighting means that are able to generate different colors, e.g., RGB LEDs, can additionally be used. Due to the size of the conventional light guide 8, a sufficient travel path of the light is available, such that the colors mix sufficiently and a homogeneous light color arrives in the region of the two-dimensional light guide 1.

The conventional light guide 8 is surrounded by air in the exemplary embodiment depicted here, such that its design made of a material, for example of polycarbonate, is sufficient. The air that surrounds it then forms the environment with a lower refractive index than that of the polycarbonate, such that the light-guiding effect can be correspondingly generated and the light can substantially be completely coupled into the film composite 2 of the two-dimensional light guide 1.

An alternative embodiment can be seen in the depiction of FIG. 3. This embodiment substantially corresponds to the depiction shown in FIG. 2. It is the case here, however, that the conventional light guide 8 is molded onto the structure of the film composite 2 on one side and onto the structure of the trim part 10 on the other side. For example, the structure is sprayed with the surface portion 13 that is not transmissive to light. To guarantee the property of a light guide in such a molded-on or in particular completely injected structure, in which the plastic carrier 11 also still surrounds the conventional light guide 8, which would also be conceivable here, the conventional light guide 8 must be provided with a corresponding coating of a low-refractive material. For example, it can be surrounded by a film made of PMMA or be coated with a corresponding paint with low-refractive properties.

Otherwise, what has already been described in the context of FIG. 2 applies analogously for the structure shown in FIG. 3.

Finally, in the depiction of FIG. 4, three different possibilities for coupling light into the conventional light guide 8 are shown. In the depiction of FIG. 4a, several lighting means 15, here RGB LEDs, are mechanically coupled to the structure of the light guide to correspondingly supply the surface of the latter with light and to transmit the light according to the drawn arrow labelled 16, in particular to the injection-molded film composite 2.

In the depiction of FIG. 4b, an alternative structure is shown. Instead of several small lighting means 15, as in the depiction of FIG. 4a, two larger lighting means 17 are respectively arranged on the end faces of the conventional light guide 8 and couple in the light. Via decoupling structures not depicted here, the light can, for example, be decoupled from the conventional light guide 8 upwards or downwards or towards or away from the viewer.

In the depiction of FIG. 4c, a further variant of the conventional light guide 8 can additionally be seen. The lighting means 15 are again embodied as smaller LEDs than in the depiction of FIG. 4b here. Unlike in the previous figures, they are directly injected into the material of the light guide 8, and thus for example into the polycarbonate. Naturally, this structure would also be conceivable with larger lighting means in the region of the end faces in addition or as an alternative to the structure depicted here. The light input couplings of FIGS. 4a and 4b could additionally be combined with each other. In addition, it would also be conceivable to correspondingly couple light into the conventional light guide 8 via injected lighting means 15, 17 on the one hand and additionally via further merely coupled lighting means 15, 17 on the other hand.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for forming a trim part, the method comprising:

forming a two-dimensional light guide configured to actively light a surface portion, wherein the two-dimensional light guide has at least three layers, wherein the at least three layers include two layers and a light guidance layer arranged between the two layers, wherein the two layers and the light guidance layer are films, wherein the two layers have a lower refractive index than the light guidance layer, wherein one of the two layers has decoupling structures for light, wherein the forming the two-dimensional light guide comprises forming the at least three layers form as a film composite by coextruding the two layers and light guidance layer; and arranging at least one light source on an end face of the two-dimensional light guide, wherein the at least one light source comprises at least one light indirectly connected to the two-dimensional light guide via an input coupling light guide, wherein the at least one light source is arranged, as seen in a viewing direction onto the trim part, hidden behind a non-light-transmissive surface portion and is connected to the two-dimensional light guide, wherein the input coupling light guide has a greater thickness than and is coupled with the film composite, wherein the input coupling light guide is adhered, welded or injection-moulded onto the film composite, wherein the two-dimensional light guide is connected to a carrier and a light-transmissive decoration by coextrusion, calendaring, or back-injection, and wherein the connected two-dimensional light guide, the carrier, and the light-transmissive decoration is injection-moulded onto the non-light-transmissive surface portion and the at least one light source, or the non-light-transmissive surface portion and the at least one light source are injection-moulded onto the connected two-dimensional light guide, the carrier and the light-transmissive decoration.

2. The method of claim 1, further comprising:

applying a protective film on one or on both surfaces of the film composite.

* * * * *